US011822450B2

(12) United States Patent
Nakryyko et al.

(10) Patent No.: US 11,822,450 B2
(45) Date of Patent: Nov. 21, 2023

(54) AUTOMATIC ISSUE DETECTION AND ANALYSIS FOR MULTI-PARADIGM PROGRAMMING LANGUAGE APPLICATIONS

(71) Applicant: SAP SE, Walldorf (DE)

(72) Inventors: Lyubov Nakryyko, Heidelberg (DE); Susanne Glaenzer, Leimen (DE)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 17/580,331

(22) Filed: Jan. 20, 2022

(65) Prior Publication Data

US 2023/0229578 A1  Jul. 20, 2023

(51) Int. Cl.
*G06F 11/00* (2006.01)
*G06F 11/30* (2006.01)
*G06F 16/2453* (2019.01)
*G06F 11/34* (2006.01)
*G06F 11/07* (2006.01)

(52) U.S. Cl.
CPC ...... *G06F 11/3075* (2013.01); *G06F 11/0775* (2013.01); *G06F 11/3419* (2013.01); *G06F 16/2453* (2019.01)

(58) Field of Classification Search
CPC .................. G06F 11/3075; G06F 11/0775
See application file for complete search history.

(56) References Cited

U.S. PATENT DOCUMENTS

| 10,031,796 | B1* | 7/2018 | Havemose ............ G06F 11/079 |
| 11,321,332 | B2* | 5/2022 | O'Hara ............ G06F 16/24568 |
| 2016/0371180 | A1* | 12/2016 | Urmanov ............ G06F 11/3075 |
| 2018/0225605 | A1* | 8/2018 | Fabara ............... G06Q 10/0635 |

* cited by examiner

*Primary Examiner* — Amine Riad
(74) *Attorney, Agent, or Firm* — SCHWEGMAN LUNDBERG & WOESSNER, P.A.

(57) ABSTRACT

In an example embodiment, a solution is provided that detects performance degradation of a particular functionality or an overall system problem using machine learning, Mann-Kendall tests, and correlation tests. After a problem has been automatically detected, the first steps of a root cause analysis may be automatically performed, indicating whether, for example non-optimal ABAP coding, a database issue, or hardware or software bottleneck, or some combination thereof. This approach allows a system to rapidly identify a system performance problem and its root cause by combing several data sources. One can see immediately, for example, whether an ABAP code change, an expensive SQL statement, or the combination of both led to an increase in the average response times of a transaction over time.

20 Claims, 8 Drawing Sheets

Transaction profile: Times: T Total time (s), θ Time/step (ms)

| Report or Transaction name | # Steps | T Response Time | θ Time | T CPU-Time | θ CPU Time | T DB Time | θ DB Time | T Time | θ Time | T Wait Time | θ Wait Time | # Roundtrips | θ GUI Time |
|---|---|---|---|---|---|---|---|---|---|---|---|---|---|
| SAPLQIWK | 705283 | 9582875 | 1,364.1 | 181.97 | 25.9 | 3255 | 463.4 | 0.0 | 0.0 | 1.489 | 0.2 | | 0.0.0 |
| SAPMHTTP | 11831471 | 1927797 | 148.6 | 263.05 | 22.6 | 1148 | 97.1 | 47.4.1 | 4.28 | 18.9 | 1.6 | | 0.0.0 |
| SAPMSSY1 | 13425 | 112631 | 162.9 | 22.931 | 1701 | 364.7 | 27.2 | 1.4 | 0.1 | 797 | 59.4 | | 0.0.0 |
| REPLICATE | 1141 | 823242 | 721,5 | 437.19 | 383,1 | 383.1 | 33.7,1 | 0.0 | 0.0 | 0.0 | 0.0 | | 0.0.0 |
| RECEIVE | 3628 | 580979 | 160.6 | 263.18 | 72.0 | 72.51 | 10.6.0 | 0.0 | 0.0 | 112 | 30.9 | | 0.0.0 |

FIG. 2

| Session Date | SAPMHTTP |
|---|---|
| 6/14/2021 | 217.087798 |
| 6/21/2021 | 14862.82754 |
| 6/28/2021 | 10268.24256 |
| 7/5/2021 | 9783.458333 |
| 7/12/2021 | 11649.97178 |
| 7/19/2021 | 14662.82143 |
| 7/26/2021 | 17682.65923 |
| 8/2/2021 | 20620.14136 |
| 8/9/2021 | 23142.58185 |
| 8/16/2021 | 27781.12054 |
| 8/23/2021 | 30390.66816 |
| 8/30/2021 | 33080.27679 |
| 9/6/2021 | 36692.01339 |
| 9/13/2021 | 42616.85458 |

*FIG. 3*

AUTOMATIC ISSUE DETECTION AND ANALYSIS FOR MULTI-PARADIGM PROGRAMMING LANGUAGE APPLICATIONS

BACKGROUND

A multi-paradigm programming language is a computer language that allows programs to utilize procedural, object-oriented, or other programming principles to create software applications. One example of a multi-paradigm programming language is Advanced Business Application Programming (ABAP™) from SAP SE of Walldorf, Germany.

One common use for a multi-paradigm programming language is to create a suite of business applications that reside inside a common database, such as an in-memory database. One example of an in-memory database is HANA™, from SAP SE of Walldorf, Germany. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access.

BRIEF DESCRIPTION OF DRAWINGS

The present disclosure is illustrated by way of example and not limitation in the figures of the accompanying drawings, in which like references indicate similar elements.

FIG. 2 is a diagram illustrating an example of transaction data, in accordance with an example embodiment.

FIG. 3 is a diagram illustrating an example of generated time series data from transaction data, in accordance with an example embodiment.

DETAILED DESCRIPTION

Figure 1:
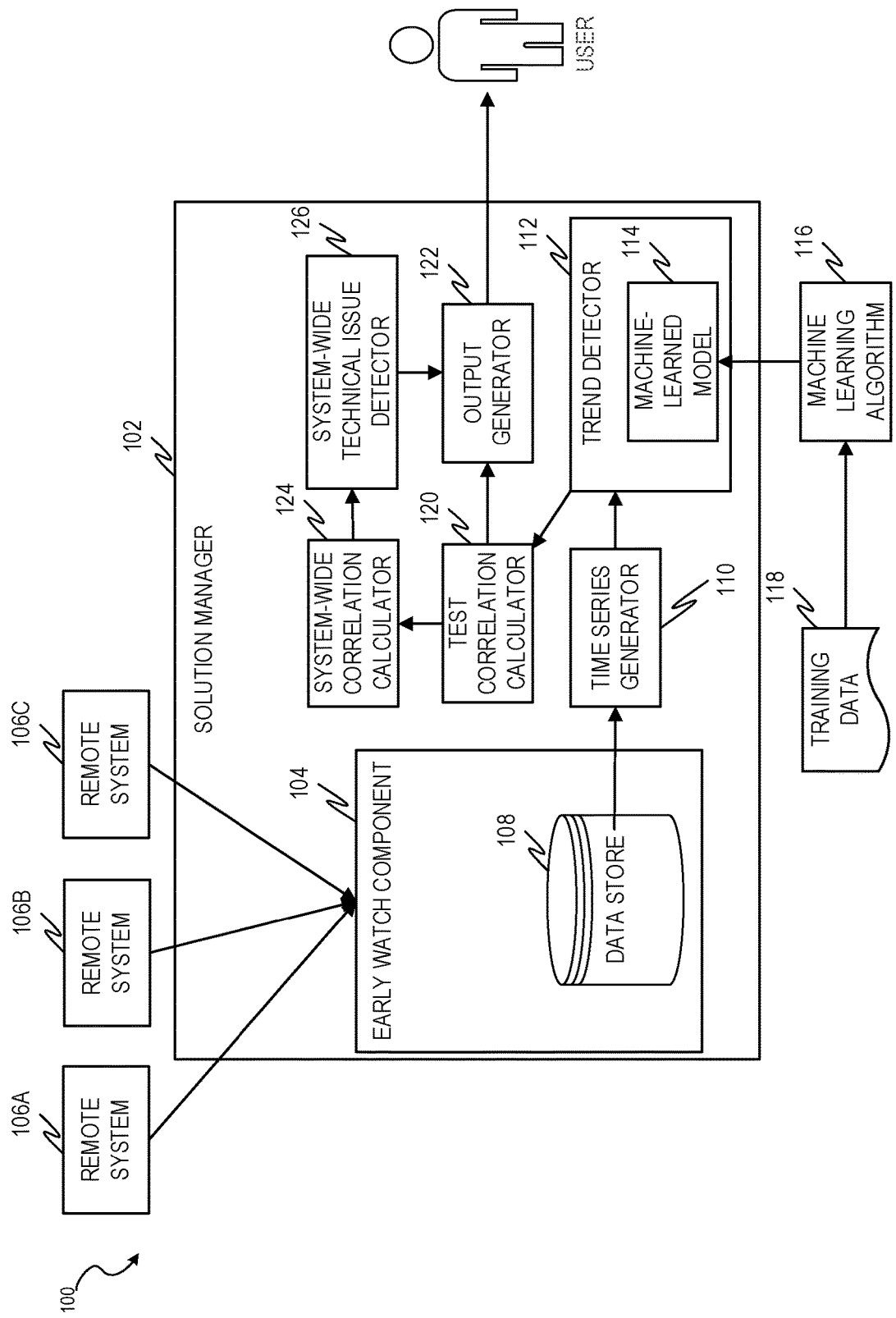
FIG. 1 is a block diagram illustrating a system for automatically detecting and analyzing technical issues with ABAP systems, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Running a suite of applications can be technically challenging, especially as operations have migrated to the cloud. Each application and component within such a suite can have technical issues arise, from performance issues to outright failures or errors.

In order to optimize performance, a specialized application may be introduced that monitors the transactions and processing blocks within a software suite while the applications and components are running. For purposes of the present document, a transaction is a software application that includes one or more logical unit of work (LUW). A LUW is an inseparable sequence of database operations which are executed either in their entirety or not at all. Thus, a transaction is a grouping of such sequences that have a dedicated name and defined input and output formats. The response time details of processing blocks (dialog modules, event blocks, function module calls, and subroutines) within a transaction are recorded and the response time of the transactions can be monitored over time. However, analyzing these transactions is technically challenging. In some instances, the transaction, when executed, generates a report.

Currently such transactions are only monitored and analyzed on an individual transaction basis; namely the processing blocks for one transaction are analyzed separately from the processing blocks for another transaction within the suite. If a trend in response time for a transaction is detected, then an administrator analyzes the raw transaction data manually to attempt to identify a root cause of the change in response time. There currently is no systematic way to analyze all systems together. In some cases, there may be as many as 20,000 systems that need to be analyzed, and thus it would be beneficial to have a solution that would overcome these technical issues.

In an example embodiment, a solution is provided that detects performance degradation of a particular functionality or an overall system problem using machine learning, Mann-Kendall tests, and correlation tests. After a problem has been automatically detected, the first steps of a root cause analysis may be automatically performed, indicating whether, for example non-optimal ABAP coding, a database issue, a hardware or software bottleneck, or some combination of these are the reason for a performance degradation. This approach allows a system to rapidly identify a system performance problem by combining several data sources. One can see immediately, for example, whether a non-optimal ABAP coding change, a database issue, an expensive SQL statement, or some combination of these led to an increase in the average response times of a transaction over time. The solution is also able to detect more technical issues than prior art solutions, as is it able to match a complete list of transactions that behave in a similar manner, and thus is able to detect all the affected transactions in a system instead of just some of them. Additionally, an overview of all affected systems can be displayed without analyzing them individually.

FIG. 1 is a block diagram illustrating a system 100 for automatically detecting and analyzing technical issues with ABAP systems, in accordance with an example embodiment. Here, a solution manager 102 includes an early watch component 104. The early watch component 104 collects early watch data from one or more remote systems 106A-106C operating ABAP applications. Early watch component 104 may include a data store 108 in which the early watch data is stored.

In some implementations, the early watch component 104 may be configured to provide a diagnostic service to monitor processes and systems. The early watch component 104 may include information about system stability (e.g., availability, central processing unit (CPU) and memory utilization, number of dumps, and the like) in the system being monitored. Furthermore, the early watch component 104 may be configured as a prerequisite for service level reporting as well as remote and onsite services.

Each piece of early watch data may be a transaction, namely an identification of an operation performed by an ABAP application on one of the one or more remote systems 106A-106C and any metadata associated with the operations, such as timestamps, response times, CPU processing cycles/time, and so forth.

A time series generator 110 then generates one or more time series based on the early watch data stored in the data store 108, with each time series corresponding to a different transaction. As described earlier, a transaction may also be thought of as a procedure or report. A time series is a sequence of observations recorded at regular time intervals. Thus, the time series for a given procedure would include all the transactions that executed the procedure, in temporal order. In an example embodiment, between four weeks and fourth months of data is included in the time series, to make sure that there is enough historical data to detect a trend and that the data is still relevant. A different time series may be generated for each transaction used by each of the one or more remote systems 106A-106C.

FIG. 2 is a diagram illustrating an example of transaction data, in accordance with an example embodiment. Here, each transaction is referred to by a report or transaction name 200, and various metrics 202A-M are computed for each transaction.

FIG. 3 is a diagram illustrating an example of generated time series data from transaction data, in accordance with an example embodiment. Here, the time series data for one transaction is depicted, including the date 300 of each recorded execution of the transaction and the average response time 302 for each corresponding transaction.

Referring back to FIG. 1, a trend detector 112 then detects whether a trend exists in one metric in a time series generated by the time series generator 110. In an example embodiment, the trend detector 112 may run a Mann-Kendall (MK) trend test. This test is used to analyze data collected over time for consistently increasing or decreasing trends (monotonic) in Y values. It is a non-parametric test, meaning that it works for all distributions, whether normal or not.

The Mann-Kendall test tests whether to reject the null hypothesis ($H_0$) and accept the alternative hypothesis ($H_a$), where $H_0$: No monotonic trend
$H_a$: Monotonic trend is present The initial assumption of the Mann-Kendall test is that the $H_0$ is true and that the data must be convincing beyond a reasonable doubt before $H_0$ is rejected and $H_a$ is accepted.

The Mann-Kendall test is conducted as follows:

1. List the data in the order in which they were collected over time, $x_1, x_2, \ldots, x_n$, which denote the measurements obtained at times 1, 2, ..., n, respectively.
2. Determine the sign of all $n(n-1)/2$ possible differences $x_j - x_k$, where $j > k$. These differences are $x_2 - x_1$, $x_3 - x_1, \ldots, x_n - x_1, x_3 - x_2, \ldots, x_4 - x_2, \ldots, x_n - x_{n-2}$, $x_n - x_{n-1}$
3. Let $\text{sgn}(x_j - x_k)$ be an indicator function that takes on the values 1, 0, or −1 according to the sign of $x_j - x_k$, that is
   $\text{sgn}(x_j - x_k) = 1$ if $x_j - x_k > 0$
   $= 0$ if $x_j - x_k = 0$, or if the sign of $x_j - x_k$ cannot be determined due to non-detects
   $= -1$ if $x_j - x_k < 0$ For example, if $x_j - x_k > 0$, that means that the observation at time j, denoted by $x_j$, is greater than the observation at time k, denoted by $x_k$.

4. Compute $$S = \sum_{k=1}^{n-1} \sum_{j=k+1}^{n} \text{sgn}(x_j - x_k) \quad (1)$$

which is the number of positive differences minus the number of negative differences. If S is a positive number, observations obtained later in time tend to be larger than observations made earlier. If S is a negative number, then observations made later in time tend to be smaller than observations made earlier.

5. If $n \leq 10$, look up S in a table of probabilities. If this probability is less than $\alpha$ (the probability of concluding a trend exists when there is none), then reject the null hypothesis and conclude the trend exists. If n cannot be found in the table of probabilities (which can happen if there are tied data values), the next value farther from zero in the table used. For example, if S=12 and there is no value for S=12 in the table, it is handled the same as S=13.

If n>10, continue with steps 6 through 10 to determine whether a trend exists.

6. Compute the variance of S as follows:

$$\text{VAR}(S) = \frac{1}{18}\left[n(n-1)(2n+5) - \sum_{p=1}^{g} c_p(c_p - 1)(2t_p + 5)\right]$$

where g is the number of tied groups and $t_p$ is the number of observations in the p th group. For example, in the sequence of measurements in time {23, 24, 29, 6, 29, 24, 24, 29, 23} we have g=3 tied groups, for which $t_1=2$ for the tied value 23, $t_2=3$ for the tied value 24, and $t_3=3$ for the tied value 29. When there are ties in the data due to equal values or non-detects, VAR(S) is adjusted by a tie correction method.

7. Compute the Mann-Kendall test statistic, $Z_{MK}$, as follows:

$$Z_{MK} = \frac{S-1}{\sqrt{\text{VAR}(S)}} \text{ if } S > 0$$
$$= 0 \text{ if } S = 0$$
$$= \frac{S+1}{\sqrt{\text{VAR}(S)}} \text{ if } S > 0$$

A positive (negative) value of $Z_{MK}$ indicates that the data tend to increase (decrease) with time.

8. Suppose one wants to test the null hypothesis $H_0$: No monotonic trend versus the alternative hypothesis $H_a$: Upward monotonic trend at the Type I error rate $\alpha$, where $0 < \alpha < 0.5$. (Note that $\alpha$ is the tolerable probability that the Mann-Kendall test will falsely reject the null hypothesis.) Then $H_0$ is rejected and $H_a$ is accepted if $Z_{MK} \geq Z_{1-\alpha}$ is $100(1-\alpha)^{th}$ percentile of the standard normal distribution.

9. To test $H_0$ above versus $H_a$: Downward monotonic trend at the Type I error rate α, $H_0$ is rejected and $H_a$ is accepted if $Z_{MK} \leq Z_{1-\alpha}$.

10. To test the $H_0$ above versus

H a: Upward or downward monotonic trend at the type I error α, $H_0$ is rejected and $H_a$ is accepted if $|Z_{MK}| \geq Z_{1-\alpha/2}$, where the vertical bars denote absolute value.

In an example embodiment, the metric being examined during the Mann-Kendall test is average response time, but in some example embodiments, other metrics may be examined in lieu of average response time. A p-value is also computed during the Mann-Kendall test. The p-value is an indication of the significance of the output of the test, or more precisely the probability of observing data at least as extreme as the observed data, given the null hypothesis is true. There are a number of parameters computed during the Mann-Kendall test. In an example embodiment, only three are relevant to the trend detector 112: whether the trend is increasing or decreasing, the p-value, and the slope. The p-value and the slope may be compared with predetermined thresholds to determine whether the trend detector 112 considers there to be a trend in the time series data. Thus, for example, the trend detector may perform a Mann-Kendall test for the time series data for each component in each system, and those time series whose Mann-Kendall tests return a p-value of less than 0.05 and a slope of greater than 20 will be considered trends.

In one example embodiment, the trend detector 112 may incorporate a machine-learned model 114 trained by a machine-learning algorithm 116. More particularly, the training process may involve learning a threshold for the slope, above which a trend is considered significant enough to be considered a trend. Thus, rather than, for example, the threshold being set to 20 specifically, the threshold may be learned through the training of the machine-learned model.

The machine learning algorithm 116 may iterate among various thresholds, testing training data against the value for the threshold, and evaluating a loss function at each iteration, until the loss function is minimized, at which stage the threshold for that minimum loss function is taken as the learned value. The machine learned model may then be retrained at a later stage, altering the threshold, based on new training data and/or user feedback. Training data 118 may include manually labeled test results. The labels may indicate whether the test results are considered a trend and the training may learn the threshold for slope based on the test results and the labels.

The machine learning algorithm 116 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The output of the trend detector 112 may be an identification of each transaction having a detected trend in the metric (e.g., response time) that exceeds the learned threshold from the machine-learned model 114 (and have a p-value less than a particular value). These are transactions having a detected trend.

A test correlation calculator 120 may then identify correlations among multiple metrics in any time series with a detected trend in the response time metric. Notably, these correlations are examined across multiple tests on the same transaction. Thus, for example, the test correlation calculator 120 may test for correlations in trends among CPU time, database time, graphical user interface time, wait time, and Structured Query Language (SQL) statement elapsed time for a particular transaction (assuming a trend was detected in the average response time in the time series data for the transaction). Thus, for example, the test correlation calculator 120 may determine that there is a correlation in the trends between CPU time and graphical user interface time, but not among those metrics and database time, wait time, and SQL statement elapsed time.

More particularly, the correlation between transactions may be computed mathematically as being a value between 0 and 1, with 0 being no correlation and 1 being complete correlation. This correlation value may be compared with a threshold, such as 0.9, above which the correlation is significant enough to conclude that there is a correlation in the trends between the two tests.

In an example embodiment, the correlation value may be computed by using one or more correlation tests. One of these correlation tests includes the computing of Pearson's correlation coefficient. Pearson's correlation coefficient is the covariance of the two variables divided by the product of their standard deviations. The form of the definition involves a "product moment" (that is, the mean (the first moment about the origin) of the product of the mean-adjusted random variables; hence the modifier product-moment in the name.

Pearson's correlation coefficient, when applied to a population, is commonly represented by the Greek letter ρ (rho) and may be referred to as the population correlation coefficient or the population Pearson correlation coefficient. Given a pair of random variables (X, Y), the formula for ρ is:

$$\rho_{X,Y} = \frac{\text{cov}(X, Y)}{\sigma_X \sigma_Y}$$

where:

cov is the covariance $\sigma_X$ is the standard deviation of X $\sigma_Y$ is the standard deviation of Y The formula for ρ can be expressed in terms of mean and expectation. Since $$\text{cov}(X,Y) = \mathbb{E}\left[(X-\mu_X)(Y-\mu_Y)\right],$$

the formula for ρ can also be written as $$\rho_{X,Y} = \frac{\mathbb{E}[(X-\mu_X)(Y-\mu_Y)]}{\sigma_X \sigma_Y}$$

where:

$\sigma_Y$ and $\sigma_X$ are defined as above $\mu_X$ is the mean of X $\mu_Y$ is the mean of Y $\mathbb{E}$ is the expectation.

The formula for ρ can be expressed in terms of uncentered moments. Since $\mu_X = \mathbb{E}[X]$ $\mu_Y = \mathbb{E}[Y]$ $\sigma_X^2 = \mathbb{E}[(X-\mathbb{E}[X])^2] = \mathbb{E}[X^2] - (\mathbb{E}[X])^2$ $\sigma_Y^2 = \mathbb{E}[(Y-\mathbb{E}[Y])^2] = \mathbb{E}[Y^2] - (\mathbb{E}[Y])^2$ $\mathbb{E}[(X-\mu_X)(Y-\mu_Y)] = \mathbb{E}[(X-\mathbb{E}[X])(Y-\mathbb{E}[Y])] = \mathbb{E}[XY] - \mathbb{E}[X]\mathbb{E}[Y],$ the formula for ρ can also be written as $$\rho_{X,Y} = \frac{\mathbb{E}[X\ Y] - \mathbb{E}[X]\mathbb{E}[Y]}{\sqrt{\mathbb{E}[X^2] - (\mathbb{E}[X])^2}\sqrt{\mathbb{E}[Y^2] - (\mathbb{E}[Y])^2}}.$$

Figure 4:
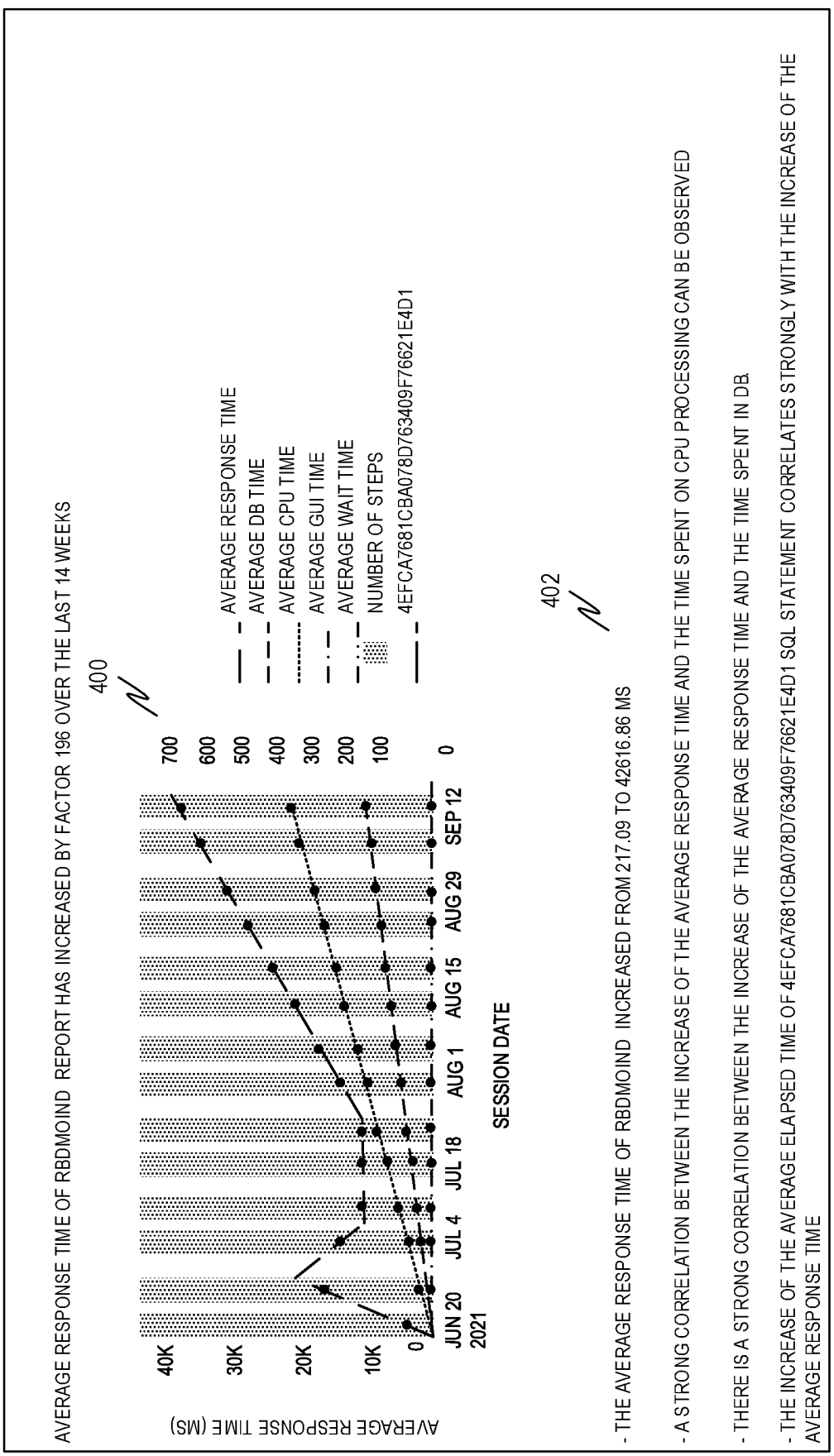
FIG. 4 is a diagram illustrating an example output, in accordance with an example embodiment.

An output generator 122 may then generate an output to a user for each transaction having a detected trend in the metric. FIG. 4 is a diagram illustrating an example output, in accordance with an example embodiment. The output may include, for example, a graph 400 indicating the metric (e.g., average response time), over time, along with values of other metrics. Text 402 may be automatically generated for this output that describes whether there is a correlation between the metric and other metrics for the transaction, as determined by the test correlation calculator 120. In an example embodiment, such a correlation may be described in the text if the correlation is significant enough to conclude that there is a correlation in the trends between the tests (e.g., each metric whose correlation value is greater than or equal to 0.9).

A system-wide correlation calculator 124 may then calculate correlation between transactions, with respect to the metric (e.g., response time). Again, correlation may be measured as a value between 0 and 1, but this correlation is across transaction instead of across metrics. Outliers in the metrics used in the correlations may be removed prior to the system-wide correlations being computed.

Figure 5:
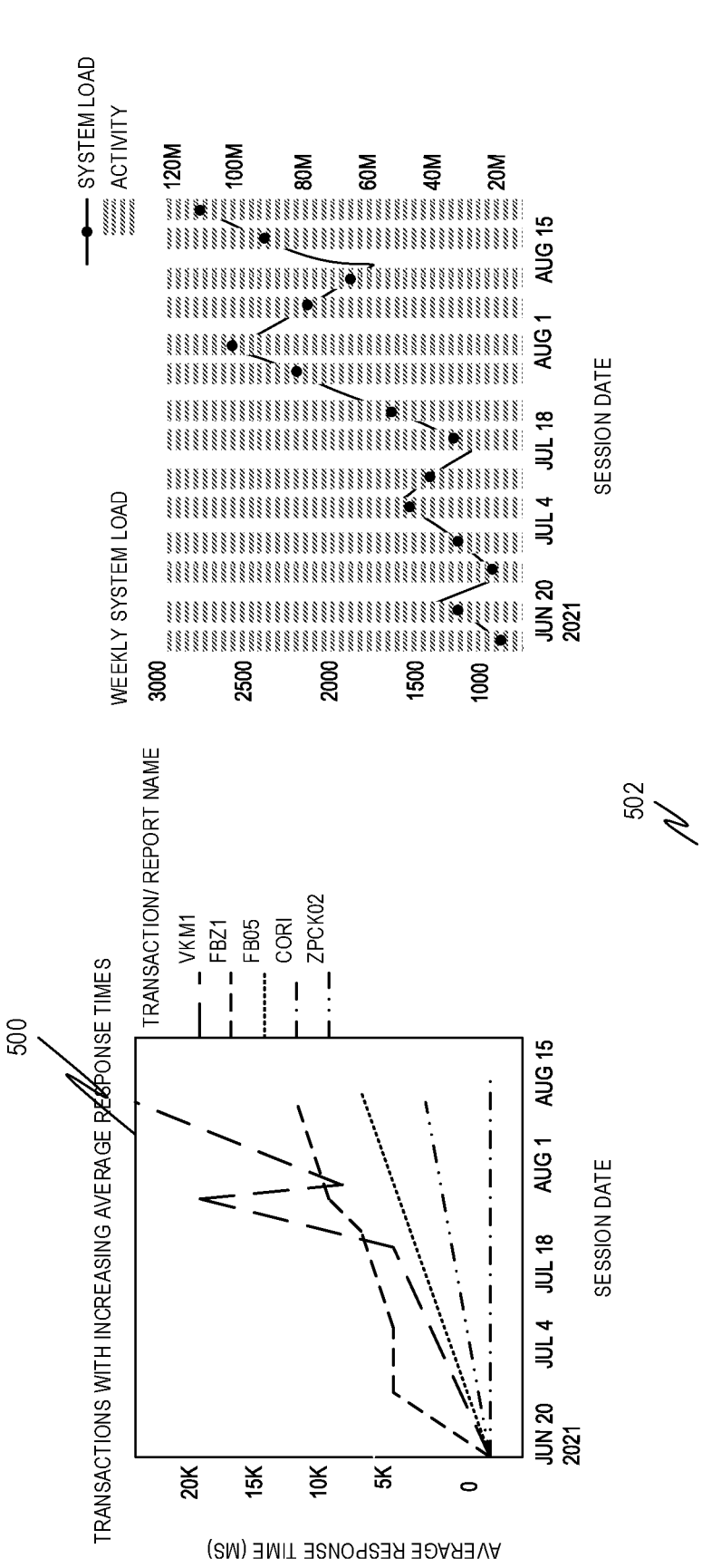
FIG. 5 is a diagram illustrating a system-wide technical issue alert, in accordance with an example embodiment.

A system-wide technical issue detector 126 may then apply a series of rules to the computed system-wide correlations. These rules include conditions to be evaluated. If all the conditions evaluate as true, then a system-wide technical issue has been identified and the output generator 122 may then alert the user to this fact. FIG. 5 is a diagram illustrating a system-wide technical issue alert, in accordance with an example embodiment. The idea here is to identify a set of transactions that suffer from a common performance degradation root cause. Having the knowledge of the common root cause will help speed issue resolution. As with the earlier alert, this alert may include a combination of one or more graphs 500 and text 502 indicating how many transactions show an increase in average response times as well as depicting these response times in the one or more graphs 500.

The one or more rules may include rules indicating whether enough transactions experience upward trends in response time to justify the identification of a system-wide technical issue. In an example embodiment, these rules include:

(1) Whether the number of transactions that have an increasing trend exceed a preset value (e.g., 10).
(2) Whether the ratio of transactions that show a high correlation with each other to overall transactions exceed a preset value (e.g., ⅔).
(3) Whether overall system response time increase is greater than a preset value (e.g., 24%).

In an example embodiment, all three of these conditions must be satisfied in order for a system-wide technical issue to be identified.

Additionally, in some example embodiments, an additional preprocessing step is introduced that limits the transaction data used to perform the above analysis. Specifically, there may be some transactions that have very unstable average response times due to their functionality, and thus it would be counterproductive to generate alerts if their average response times increase. Such transactions may be termed "volatile," in contrast to other transactions that may be termed "constant" and may have no limits on their analysis.

Determination of which transactions are volatile may be made using a k-means clustering algorithm. In an example embodiment, the inputs for the k-means clustering algorithm may be coefficients of a variation of time series of average CPU and database times. The number of clusters may be set to a fixed value, such as eight. Additionally, a set number of constant clusters may be chosen, such as two. Thus, for example, the two clusters (of the eight total clusters) having the lowest coefficients of variation may be considered to be constant, while the other six are considered volatile. In an example embodiment, none of the above-described trend analysis and reporting is performed on any of the volatile clusters.

Figure 6:
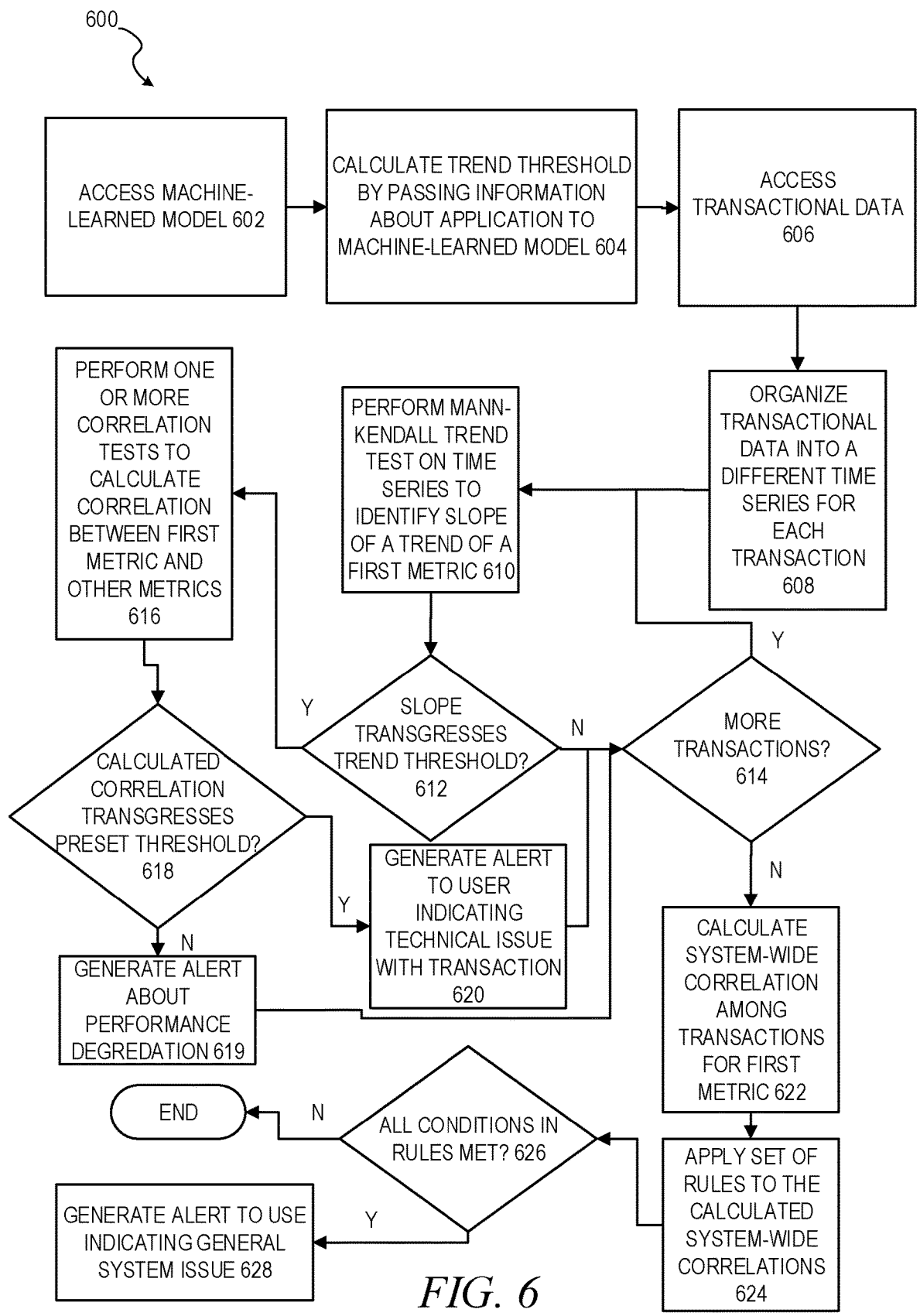
FIG. 6 is a flow diagram illustrating a method of detecting technical issues in software transactions in a computer system, in accordance with an example embodiment.

FIG. 6 is a flow diagram illustrating a method 600 of detecting technical issues in software transactions in a computer system, in accordance with an example embodiment. At operation 602, a machine-learned model trained to calculate a trend threshold for analyzing data regarding transactions is accessed. At operation 604, the trend threshold is calculated by passing information about a multi-paradigm programming language application to the machine-learned model. At operation 606, transactional data regarding transactions performed by the multi-paradigm programming language application is accessed. The transactional data includes, for each transaction, a plurality of metrics.

At operation 608, the transactional data is organized such that transactional data for each transaction is organized into a different time series. Then a loop is repeated for each different time series. At operation 610, a Mann-Kendall trend test is performed on the time series to identify a slope of a trend of a first of the plurality of metrics. At operation 612, it is determined whether the slope of the trend of the first of the plurality of metrics transgresses the calculated trend threshold. If not, then at operation 614, it is determined if there are any more transactions. If so, the loop advances back to operation 610 for the next transaction. If at operation 612 it was determined that the slope of the trend did not transgress the calculated trend threshold, then at operation 616, one or more correlation tests are performed to calculate a correlation between the first of the plurality of metrics and one or more other metrics of the plurality of metrics. At operation 618, it is determined whether the calculated correlation transgresses a preset threshold. If so, then at operation 620, an alert to a user is generated indicating a technical issue with the transaction. Then, or if at operation 618 it was determined that the calculated correlation did not transgress the preset threshold, at operation 614 it is determined if there are any more transactions. If so, the loop advances back to operation 610 for the next transaction. If not, then the method 600 advances to operation 622.

At operation 622, a system-wide correlation is calculated among each of the plurality of transactions for the first metric. At operation 624, a set of rules is applied to the calculated system-wide correlations, with each rule in the set of rules evaluating a different condition. In an example embodiment, the set of rules includes: determining whether a number of transactions whose calculated system-wide correlation transgresses the preset threshold is greater than a first minimum value; determining whether a ratio of transactions whose calculated system-wide correlation transgresses the preset threshold to all transactions is greater than a second minimum value; and determining whether an average of the first of the plurality of metrics across all transactions increased more than a third minimum value.

At operation 626, it is determined whether all the conditions are met. If so, then at operation 628, an alert is generated to the user indicating a general system issue. If not, then the method 600 ends.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
  at least one hardware processor; and
  a computer-readable medium storing instructions that, when executed by the at least one hardware processor, cause the at least one hardware processor to perform operations comprising:
    accessing a machine-learned model trained to calculate a trend threshold for analyzing data regarding computer transactions;
    calculating the trend threshold by passing information about a multi-paradigm programming language application to the machine-learned model;
    accessing transactional data regarding computer transactions performed by the multi-paradigm programming language application, the transactional data including, for each computer transaction, a plurality of metrics;
    organizing the transactional data such that transactional data for each type of transaction is organized into a different time series;
    for a first of the different time series:
      performing a Mann-Kendall trend test on the time series to identify a slope of a trend of a first of the plurality of metrics;
      in response to a determination that the slope of the trend of the first of the plurality of metrics transgresses the calculated trend threshold, performing one or more correlation tests to calculate a correlation between the first of the plurality of metrics and one or more other metrics of the plurality of metrics; and
      in response to a determination that the calculated correlation transgresses a preset threshold, generating an alert to a user indicating a technical issue with the type of transaction.

Example 2. The system of Example 1, wherein the operations further comprise:
  repeating the performing the Mann-Kendall trend test for each time series of the different time series; and
  performing the one or more correlation tests for any time series whose Mann-Kendall trend test identified a slope of a trend of the first of the plurality of metrics that transgresses the calculated trend threshold.

Example 3. The system of Example 2, wherein the operations further comprise:
  calculating a system-wide correlation between the first of the plurality of metrics for the first of the transactions and the first of the plurality of metrics for each of the other transactions in the plurality of transactions;
  applying a set of rules to the calculated system-wide correlations, each rule in the set of rules evaluating a different condition; and
  in response to a determination that all of the conditions are met, generating an alert to the user indicating a general system issue.

Example 4. The system of Example 3, wherein the set of rules includes:
  determining whether a number of transactions whose calculated system-wide correlation transgresses the preset threshold is greater than a first minimum value;
  determining whether a ratio of transactions whose calculated system-wide correlation transgresses the preset threshold to all transactions is greater than a second minimum value; and
  determining whether an average of the first of the plurality of metrics across all transactions increased more than a third minimum value.

Example 5. The system of any of Examples 1-4, wherein the transactional data organized into a different time series includes only transactional data labeled as constant based on output of a k-means clustering algorithm.

Example 6. The system of Example 5, wherein the k-means clustering algorithm organizes transactional data into a first number of clusters based on coefficients of variation of time series of average CPU and database times, and selects a second number of clusters, of the first number of clusters, having the lowest coefficients of variation as constant.

Example 7. The system of any of Examples 1-6, wherein the one or more correlation tests includes computing a Pearson correlation coefficient.

Example 8. The system of any of Examples 1-7, wherein the operations further comprise training the machine-learned model using a machine learning algorithm by iterating among various thresholds, testing training data against a value for the threshold, and evaluating a loss function at each iteration, until the loss function is minimized.

Example 9. A method comprising:
  accessing a machine-learned model trained to calculate a trend threshold for analyzing data regarding computer transactions;
  calculating the trend threshold by passing information about a multi-paradigm programming language application to the machine-learned model;
  accessing transactional data regarding computer transactions performed by the multi-paradigm programming language application, the transactional data including, for each computer transaction, a plurality of metrics;
  organizing the transactional data such that transactional data for each type of transaction is organized into a different time series;
  for a first of the different time series:
  performing a Mann-Kendall trend test on the time series to identify a slope of a trend of a first of the plurality of metrics;
  in response to a determination that the slope of the trend of the first of the plurality of metrics transgresses the calculated trend threshold, performing one or more correlation tests to calculate a correlation between the first of the plurality of metrics and one or more other metrics of the plurality of metrics; and
  in response to a determination that the calculated correlation transgresses a preset threshold, generating an alert to a user indicating a technical issue with the type of transaction.

Example 10. The method of Example 9, further comprising:
repeating the performing the Mann-Kendall trend test for each time series of the different time series; and
performing the one or more correlation tests for any time series whose Mann-Kendall trend test identified a slope of a trend of the first of the plurality of metrics that transgresses the calculated trend threshold.

Example 11. The method of Example 10, further comprising:
calculating a system-wide correlation between the first of the plurality of metrics for the first of the transactions and the first of the plurality of metrics for each of the other transactions in the plurality of transactions;
applying a set of rules to the calculated system-wide correlations, each rule in the set of rules evaluating a different condition; and
in response to a determination that all of the conditions are met, generating an alert to the user indicating a general system issue.

Example 12. The method of Example 11, wherein the set of rules includes:
determining whether a number of transactions whose calculated system-wide correlation transgresses the preset threshold is greater than a first minimum value;
determining whether a ratio of transactions whose calculated system-wide correlation transgresses the preset threshold to all transactions is greater than a second minimum value; and
determining whether an average of the first of the plurality of metrics across all transactions increased more than a third minimum value.

Example 13. The method of any of Examples 9-12, wherein the transactional data organized into a different time series includes only transactional data labeled as constant based on output of a k-means clustering algorithm.

Example 14. The method of Example 13, wherein the k-means clustering algorithm organizes transactional data into a first number of clusters based on coefficients of variation of time series of average CPU and database times, and selects a second number of clusters, of the first number of clusters, having the lowest coefficients of variation as constant.

Example 15. The method of any of Examples 9-14, wherein the one or more correlation tests includes computing a Pearson correlation coefficient.

Example 16. The method of any of Examples 9-15, further comprising training the machine-learned model using a machine learning algorithm by iterating among various thresholds, testing training data against a value for the threshold, and evaluating a loss function at each iteration, until the loss function is minimized.

Example 17. A non-transitory machine-readable medium storing instructions which, when executed by one or more processors, cause the one or more processors to perform operations comprising:
accessing a machine-learned model trained to calculate a trend threshold for analyzing data regarding computer transactions;
calculating the trend threshold by passing information about a multi-paradigm programming language application to the machine-learned model;
accessing transactional data regarding computer transactions performed by the multi-paradigm programming language application, the transactional data including, for each computer transaction, a plurality of metrics;
organizing the transactional data such that transactional data for each type of transaction is organized into a different time series;
for a first of the different time series:
performing a Mann-Kendall trend test on the time series to identify a slope of a trend of a first of the plurality of metrics;
in response to a determination that the slope of the trend of the first of the plurality of metrics transgresses the calculated trend threshold, performing one or more correlation tests to calculate a correlation between the first of the plurality of metrics and one or more other metrics of the plurality of metrics; and
in response to a determination that the calculated correlation transgresses a preset threshold, generating an alert to a user indicating a technical issue with the type of transaction.

Example 18. The non-transitory machine-readable medium of Example 17, wherein the operations further comprise:
repeating the performing the Mann-Kendall trend test for each time series of the different time series; and
performing the one or more correlation tests for any time series whose Mann-Kendall trend test identified a slope of a trend of the first of the plurality of metrics that transgresses the calculated trend threshold.

Example 19. The non-transitory machine-readable medium of Example 18, further comprising:
calculating a system-wide correlation between the first of the plurality of metrics for the first of the transactions and the first of the plurality of metrics for each of the other transactions in the plurality of transactions;
applying a set of rules to the calculated system-wide correlations, each rule in the set of rules evaluating a different condition; and
in response to a determination that all of the conditions are met, generating an alert to the user indicating a general system issue.

Example 20. The non-transitory machine-readable medium of Example 19, wherein the set of rules includes:
determining whether a number of transactions whose calculated system-wide correlation transgresses the preset threshold is greater than a first minimum value;
determining whether a ratio of transactions whose calculated system-wide correlation transgresses the preset threshold to all transactions is greater than a second minimum value; and
determining whether an average of the first of the plurality of metrics across all transactions increased more than a third minimum value.

Figure 7:
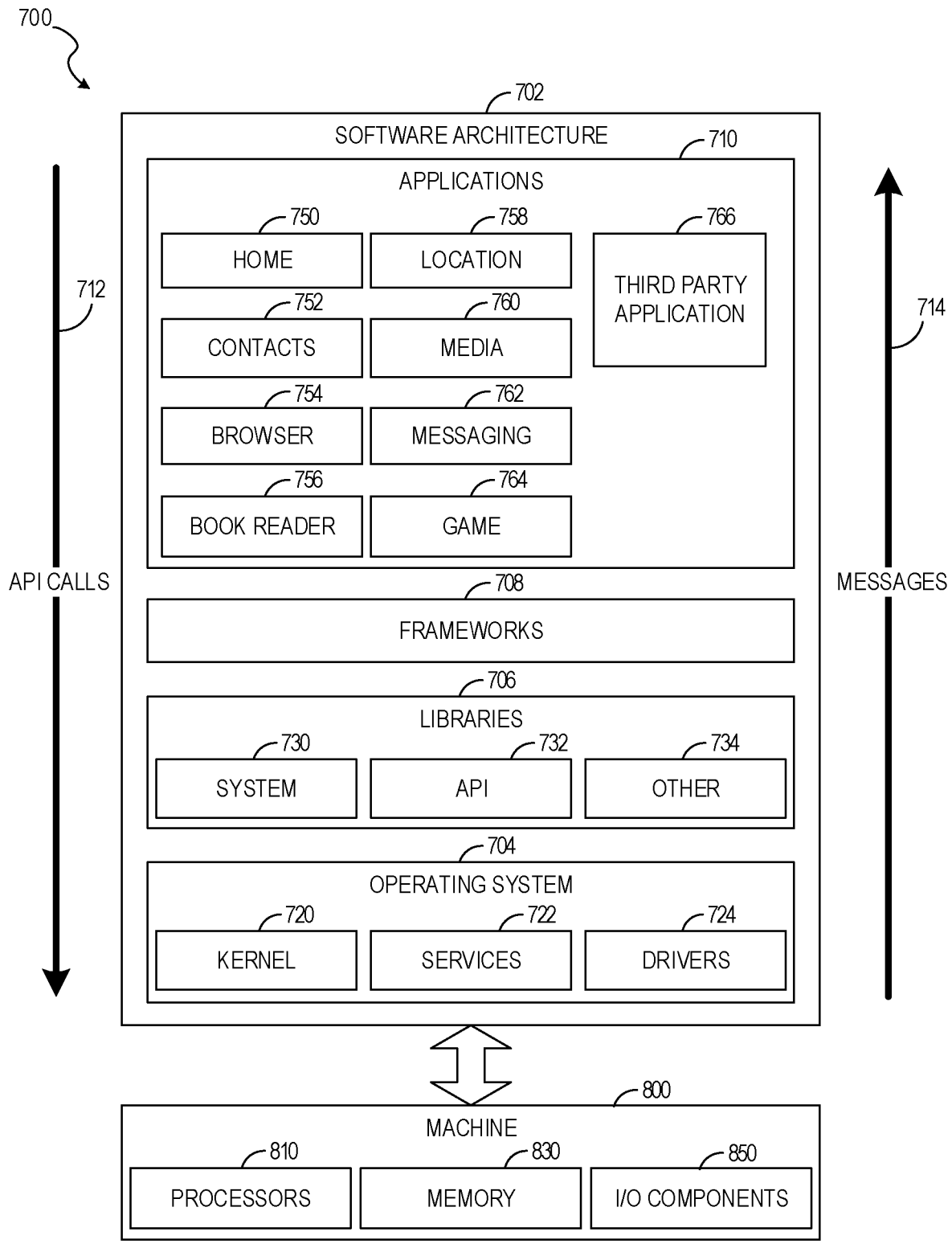
FIG. 7 is a block diagram illustrating an example architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke Application Program Interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 606 can also include a wide variety of other libraries 734 to provide many other APIs to the applications 710.

The frameworks 708 provide a high-level common infrastructure that can be utilized by the applications 710. For example, the frameworks 708 provide various graphical user interface functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. The applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 766 can invoke the API calls 712 provided by the operating system 704 to facilitate functionality described herein.

Figure 8:
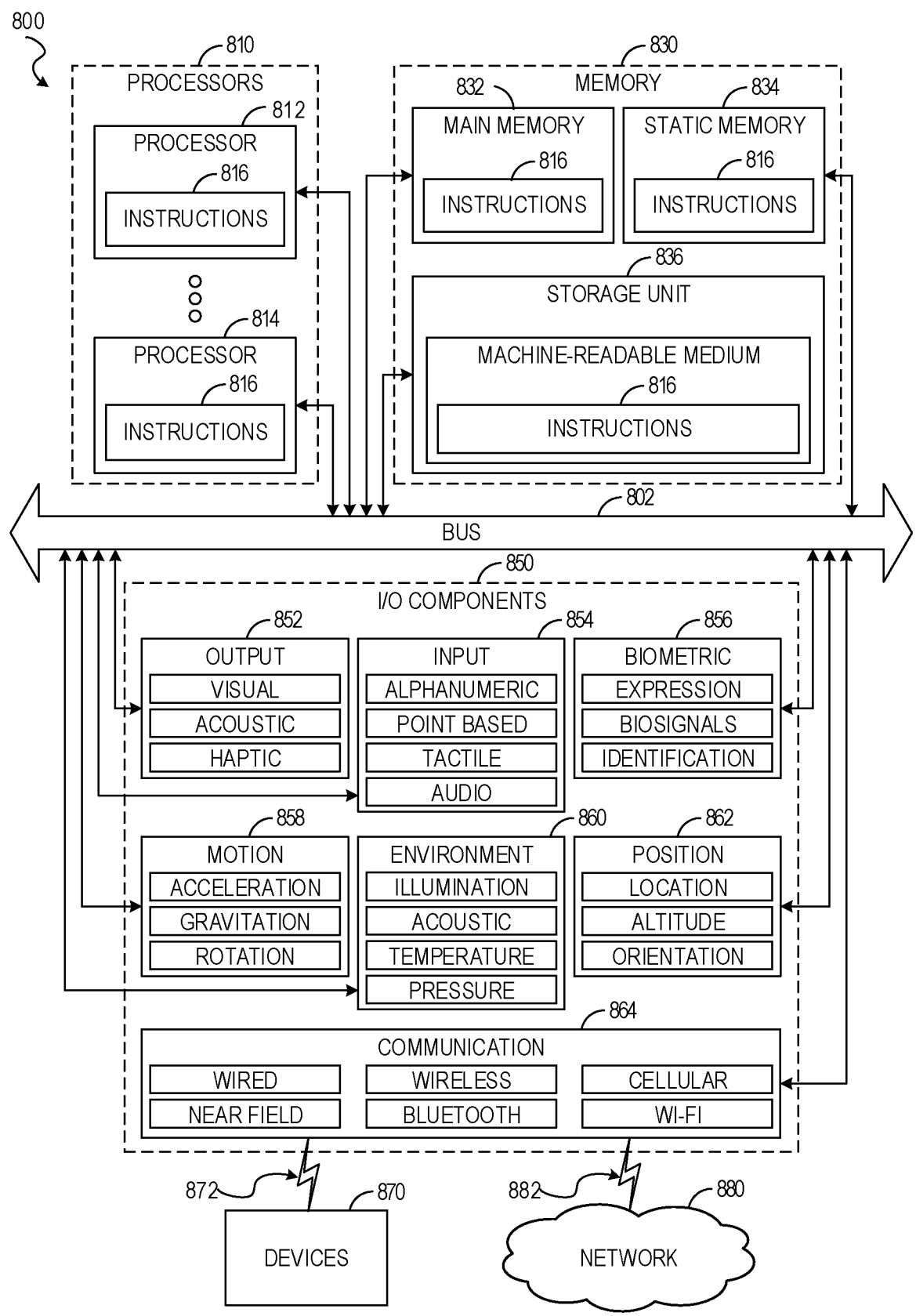
FIG. 8 illustrates a diagrammatic representation of a machine in the form of a computer system within which a set of instructions may be executed for causing the machine to perform any one or more of the methodologies discussed herein.

FIG. 8 illustrates a diagrammatic representation of a machine 800 in the form of a computer system within which a set of instructions may be executed for causing the machine 800 to perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method of FIG. 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 702. In an example embodiment, the processors 810 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 780 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing a machine-learned model trained to calculate a trend threshold for analyzing data regarding computer transactions, the transactions performed by multiple different applications in an application suite, while the multiple different applications are simultaneously running on a computer system;
   calculating the trend threshold by passing information about a multi-paradigm programming language application to the machine-learned model;
   accessing transactional data regarding computer transactions performed by the multi-paradigm programming language application, the transactional data including, for each computer transaction, a plurality of metrics;
   organizing the transactional data such that transactional data for each type of transaction is organized into a different time series;
   for a first of the different time series:
   performing a Mann-Kendall trend test on the time series to identify a slope of a trend of a first of the plurality of metrics;
   in response to a determination that the slope of the trend of the first of the plurality of metrics transgresses the calculated trend threshold, performing one or more correlation tests to calculate a correlation between the first of the plurality of metrics and one or more other metrics of the plurality of metrics; and
   in response to a determination that the calculated correlation transgresses a preset threshold, generating an alert to a user indicating a technical issue with the type of transaction.

2. The system of claim 1, wherein the operations further comprise:
   repeating the performing the Mann-Kendall trend test for each time series of the different time series; and
   performing the one or more correlation tests for any time series whose Mann-Kendall trend test identified a slope of a trend of the first of the plurality of metrics that transgresses the calculated trend threshold.

3. The system of claim 2, wherein the operations further comprise:
   calculating a system-wide correlation between the first of the plurality of metrics for the first of the transactions and the first of the plurality of metrics for each of the other transactions in the plurality of transactions;
   applying a set of rules to the calculated system-wide correlations, each rule in the set of rules evaluating a different condition; and
   in response to a determination that all of the conditions are met, generating an alert to the user indicating a general system issue.

4. The system of claim 3, wherein the set of rules includes:
determining whether a number of transactions whose calculated system-wide correlation transgresses the preset threshold is greater than a first minimum value;
determining whether a ratio of transactions whose calculated system-wide correlation transgresses the preset threshold to all transactions is greater than a second minimum value; and
determining whether an average of the first of the plurality of metrics across all transactions increased more than a third minimum value.

5. The system of claim 1, wherein the transactional data organized into a different time series includes only transactional data labeled as constant based on output of a k-means clustering algorithm.

6. The system of claim 5, wherein the k-means clustering algorithm organizes transactional data into a first number of clusters based on coefficients of variation of time series of average central processing unit and database times, and selects a second number of clusters of the first number of clusters, having lowest coefficients of variation, as constant.

7. The system of claim 1, wherein the one or more correlation tests include computing a Pearson correlation coefficient.

8. The system of claim 1, wherein the operations further comprise training the machine-learned model using a machine learning algorithm by iterating among various thresholds, testing training data against a value for the threshold, and evaluating a loss function at each iteration, until the loss function is minimized.

9. A method comprising:
accessing a machine-learned model trained to calculate a trend threshold for analyzing data regarding computer transactions, the transactions performed by multiple different applications in an application suite, while the multiple different applications are simultaneously running on a computer system;
calculating the trend threshold by passing information about a multi-paradigm programming language application to the machine-learned model;
accessing transactional data regarding computer transactions performed by the multi-paradigm programming language application, the transactional data including, for each computer transaction, a plurality of metrics;
organizing the transactional data such that transactional data for each type of transaction is organized into a different time series;
for a first of the different time series:
performing a Mann-Kendall trend test on the time series to identify a slope of a trend of a first of the plurality of metrics;
in response to a determination that the slope of the trend of the first of the plurality of metrics transgresses the calculated trend threshold, performing one or more correlation tests to calculate a correlation between the first of the plurality of metrics and one or more other metrics of the plurality of metrics; and
in response to a determination that the calculated correlation transgresses a preset threshold, generating an alert to a user indicating a technical issue with the transaction.

10. The method of claim 9, further comprising:
repeating the performing the Mann-Kendall trend test for each time series of the different time series; and
performing the one or more correlation tests for any time series whose Mann-Kendall trend test identified a slope of a trend of the first of the plurality of metrics that transgresses the calculated trend threshold.

11. The method of claim 10, further comprising:
calculating a system-wide correlation between the first of the plurality of metrics for the first of the transactions and the first of the plurality of metrics for each of the other transactions in the plurality of transactions;
applying a set of rules to the calculated system-wide correlations, each rule in the set of rules evaluating a different condition; and
in response to a determination that all of the conditions are met, generating an alert to the user indicating a general system issue.

12. The method of claim 11, wherein the set of rules includes:
determining whether a number of transactions whose calculated system-wide correlation transgresses the preset threshold is greater than a first minimum value;
determining whether a ratio of transactions whose calculated system-wide correlation transgresses the preset threshold to all transactions is greater than a second minimum value; and
determining whether an average of the first of the plurality of metrics across all transactions increased more than a third minimum value.

13. The method of claim 9, wherein the transactional data organized into a different time series includes only transactional data labeled as constant based on output of a k-means clustering algorithm.

14. The method of claim 13, wherein the k-means clustering algorithm organizes transactional data into a first number of clusters based on coefficients of variation of time series of average central processing unit and database times, and selects a second number of clusters of the first number of clusters, having lowest coefficients of variation, as constant.

15. The method of claim 9, wherein the one or more correlation tests include computing a Pearson correlation coefficient.

16. The method of claim 9, further comprising training the machine-learned model using a machine learning algorithm by iterating among various thresholds, testing training data against a value for the threshold, and evaluating a loss function at each iteration, until the loss function is minimized.

17. A non-transitory machine-readable medium storing instructions which, when executed by one or more processors, cause the one or more processors to perform operations comprising:
accessing a machine-learned model trained to calculate a trend threshold for analyzing data regarding computer transactions, the transactions performed by multiple different applications in an application suite, while the multiple different applications are simultaneously running on a computer system;
calculating the trend threshold by passing information about a multi-paradigm programming language application to the machine-learned model;
accessing transactional data regarding computer transactions performed by the multi-paradigm programming language application, the transactional data including, for each computer transaction, a plurality of metrics;
organizing the transactional data such that transactional data for each type of transaction is organized into a different time series;

for a first of the different time series:

performing a Mann-Kendall trend test on the time series to identify a slope of a trend of a first of the plurality of metrics;

in response to a determination that the slope of the trend of the first of the plurality of metrics transgresses the calculated trend threshold, performing one or more correlation tests to calculate a correlation between the first of the plurality of metrics and one or more other metrics of the plurality of metrics; and in response to a determination that the calculated correlation transgresses a preset threshold, generating an alert to a user indicating a technical issue with the type of transaction.

18. The non-transitory machine-readable medium of claim 17, wherein the operations further comprise:

repeating the performing the Mann-Kendall trend test for each time series of the different time series; and performing the one or more correlation tests for any time series whose Mann-Kendall trend test identified a slope of a trend of the first of the plurality of metrics that transgresses the calculated trend threshold.

19. The non-transitory machine-readable medium of claim 18, further comprising:

calculating a system-wide correlation between the first of the plurality of metrics for the first of the transactions and the first of the plurality of metrics for each of the other transactions in the plurality of transactions;

applying a set of rules to the calculated system-wide correlations, each rule in the set of rules evaluating a different condition; and in response to a determination that all of the conditions are met, generating an alert to the user indicating a general system issue.

20. The non-transitory machine-readable medium of claim 19, wherein the set of rules includes:

determining whether a number of transactions whose calculated system-wide correlation transgresses the preset threshold is greater than a first minimum value;

determining whether a ratio of transactions whose calculated system-wide correlation transgresses the preset threshold to all transactions is greater than a second minimum value; and determining whether an average of the first of the plurality of metrics across all transactions increased more than a third minimum value.

* * * * *